United States Patent
Monde et al.

(10) Patent No.: US 6,356,839 B1
(45) Date of Patent: Mar. 12, 2002

(54) NAVIGATION SYSTEM

(75) Inventors: Yasuhiro Monde; Kazuya Tabata, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/708,522

(22) Filed: Nov. 9, 2000

Related U.S. Application Data

(63) Continuation of application No. PCT/JP99/01849, filed on Apr. 7, 1999.

(51) Int. Cl.[7] .................... G01C 21/30; G08G 1/0969
(52) U.S. Cl. .................... 701/210; 701/211; 340/995; 342/357.1
(58) Field of Search ................ 701/201, 202, 701/204, 208, 209, 210, 211; 340/995, 990, 905; 342/357.09, 357.1

(56) References Cited

U.S. PATENT DOCUMENTS

| | | | | |
|---|---|---|---|---|
| 5,910,782 A | * | 6/1999 | Schmitt et al. | 340/995 |
| 5,913,917 A | * | 6/1999 | Murphy | 701/123 |
| 5,941,933 A | * | 8/1999 | Miyake et al. | 701/208 |
| 5,999,126 A | * | 12/1999 | Ito | 342/357.1 |
| 6,067,499 A | * | 5/2000 | Yagyu et al. | 701/201 |
| 6,240,364 B1 | * | 5/2000 | Kerner et al. | 701/210 |
| 6,094,618 A | * | 7/2000 | Harada | 701/207 |
| 6,188,957 B1 | * | 2/2001 | Bechtosheim et al. | 701/209 |
| 6,192,314 B1 | * | 2/2001 | Khavakh et al. | 701/209 |
| 6,208,932 B1 | * | 3/2001 | Ohmura et al. | 701/200 |

FOREIGN PATENT DOCUMENTS

| | | |
|---|---|---|
| JP | A217409 | 1/1990 |
| JP | A4142421 | 5/1992 |
| JP | A5272983 | 10/1993 |
| JP | A883399 | 3/1996 |
| JP | A8101040 | 4/1996 |
| JP | A8210865 | 8/1996 |
| JP | A944791 | 2/1997 |
| JP | A1019583 | 1/1998 |
| JP | A10103979 | 4/1998 |
| JP | A10185603 | 7/1998 |
| JP | A10267678 | 10/1998 |
| JP | A112539 | 1/1999 |

\* cited by examiner

*Primary Examiner*—Tan Nguyen

(57) ABSTRACT

A navigation system searches for a route from the present position to a destination with considering weather information and regulation information collected by an information collecting section (2) and vehicle information input from an operating section (3).

33 Claims, 4 Drawing Sheets

QUERY

IS YOUR VEHICLE 4WD?

REPLY

Yes    No

S : PRESENT POSITION    ☂ : RAIN
D : DESTINATION         ☃ : SNOW
☀ : FAIR                ⚡ : THUNDER
☁ : CLOUDY

NAVIGATION SYSTEM

CROSS-REFERENCE TO THE RELATED APPLICATION

This application is a continuation of international Application No. PCT/JP99/01849, whose international filing date is Apr. 7, 1999, the disclosures of which Application are incorporated by reference herein.

BACKGROUND OF THE INVENTION

1. Field of the Invention

The present invention relates to a navigation system for searching for an optimum route with considering weather information.

2. Description of Related Art

A navigation system is a device for searching for a route satisfying a search condition and for displaying the route on a map. As the search condition, there is such a condition as searching for the shortest route in distance or in time from the current position to the destination.

When the retrieved route is under bad weather, it will impose heavy strain on a driver. To remove the strain of the driver as much as possible, Japanese patent application laid-open No. 8-210865/1996 discloses a technique for searching for a route in a better weather condition with considering weather information.

Although the conventional navigation system with the foregoing configuration can inform the driver of the route in the better weather condition, it does not search for the route with considering vehicle information on the vehicle itself. Accordingly, it is not unlikely that the route in the better weather condition is impassable to the vehicle, which presents a problem of possibly informing the driver of an impassable route.

The present invention is implemented to solve the foregoing problem. Therefore, it is an object of the present invention to provide a navigation system capable of informing a driver of a route positively passable to the vehicle.

SUMMARY OF THE INVENTION

A navigation system according to the present invention searches for a route from a present position to a destination with taking account of the weather information collected by information collecting means and the vehicle information input by information input means.

This offers an advantage of being able to inform a driver of a route positively passable to the vehicle.

The navigation system according the present invention may collect regulation information on a road besides the weather information, and search for the route with considering the regulation information.

This offers an advantage of being able to inform the driver of a route more positively passable to the vehicle.

The navigation system according to the present invention may search for another route if the retrieved route is probably impassable to the vehicle even though the route satisfies a search condition.

This offers an advantage of being able to inform the driver of a detour if the route satisfying the search condition is under a snow chain warning or the like because of a snowfall on the route.

The navigation system according to the present invention may search for the route with considering a time period taken to mount snow chains on tires if the vehicle carries the snow chains, but is not yet equipped with the snow chains, when the route includes a road under snow chain warning.

This offers an advantage of being able to improve the accuracy of the route searching when the search for a shortest time route is set as the search condition because the accuracy of estimated arrival time is improved.

The navigation system according to the present invention may make a presentation, when the route searching mean retrieves another route, that the another route is a roundabout route.

This offers an advantage of being able to make the driver recognize that the retrieved route is a roundabout route.

The navigation system according to the present invention may provide, when the route retrieved by the route searching mean includes a road under regulation, regulation information about the road.

This offers an advantage of being able to make the driver recognize that he or she will meet a snow chain warning or the like when taking the retrieved route.

The navigation system according to the present invention may put weather marks on pass points on the route retrieved by the route searching mean by referring to weather information collected by the information collecting means.

This offers an advantage of being able to inform the driver of the weather condition of the retrieved route.

The navigation system according to the present invention may estimate passing time at the pass points, and put the weather marks at the passing time.

This offers-an advantage of being able to inform the drier of the weather condition at the passing.

The navigation system according to the present invention may make a decision as to whether maintenance of the vehicle is necessary or not from the vehicle information input by the information input means, or from information collected by a sensor mounted on the vehicle, and exhibit information indicating need of the maintenance when it is necessary.

This offers an advantage of being able to make the driver recognize that the maintenance of the vehicle is needed.

The navigation system according to the present invention may exhibit, when the route retrieved by the route searching mean includes a toll road, a toll on the vehicle by referring to the vehicle information input by the information input means.

This offers an advantage of being able to inform the driver of the toll.

The navigation system according to the present invention may refer to the vehicle information input by the information input means when exhibiting the route retrieved by the route searching mean, make a decision as to whether a parking lot at the destination is available for the vehicle, and halt informing the parking lot when the parking lot is unavailable for the vehicle.

This offers an advantage of being able to prevent the vehicle from going to unavailable parking lot.

BRIEF DESCRIPTION OF THE DRAWINGS

FIG. 5 is a screen diagram illustrating a screen exhibiting that the retrieved route is difficult to pass through;

FIG. 7 is a screen diagram illustrating a screen displaying route information with marks indicating weather at points passed by.

DETAILED DESCRIPTION OF THE PREFERRED EMBODIMENTS

The best mode of the present invention will now be described with reference to the accompanying drawings to explain the present invention in more detail.

EMBODIMENT 1

Figure 1:
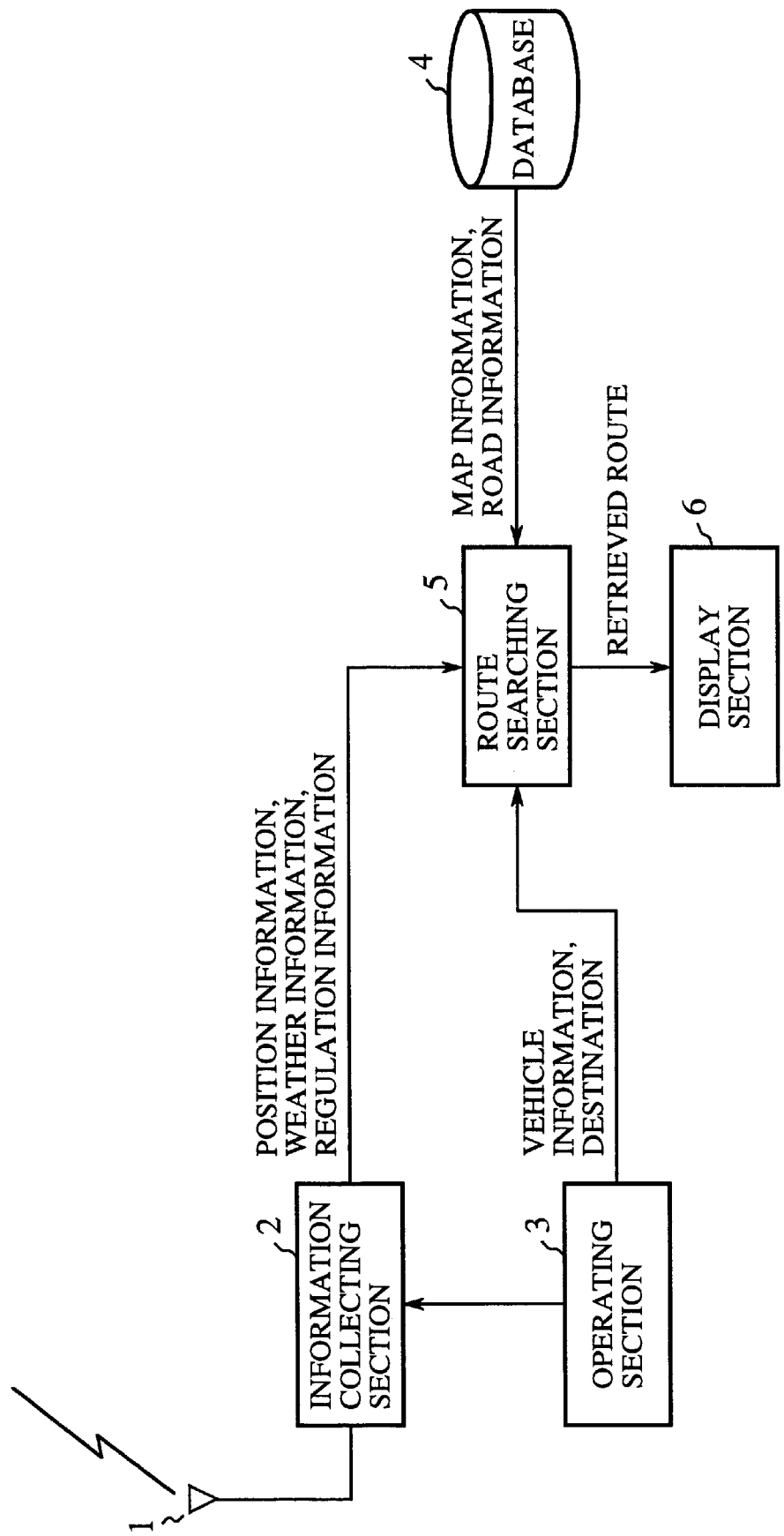
FIG. 1 is a block diagram showing a configuration of an embodiment 1 of a navigation system in accordance with the present invention.

FIG. 1 is a block diagram showing a configuration of an embodiment 1 of a navigation system in accordance with the present invention. In this figure, the reference numeral 1 designates a receiving antenna (information collecting means) for receiving from a GPS (Global Positioning System) not only position information indicating a current location of the vehicle, but also weather information and regulation information on roads; 2 designates an information collecting section (information collecting means) for collecting the position information, weather information and regulation information received by the receiving antenna 1; 3 designates an operating section (information input means) for inputting a destination and vehicle information on the vehicle itself; 4 designates a database for storing map information, road information and the like; 5 designates a route searching section (route searching mean) for searching for a route from the current position to the destination with considering the position information, weather information, regulation information and vehicle information; and 6 designates a display section. (presentation mean) for displaying the route retrieved by the route searching section 5.

Next, the operation will be described.

To make a search for the route to the destination in the present embodiment 1 of the navigation system, it is necessary for a driver or passenger (called "driver or the like" from now on) to manipulate the operating section 3 to input the vehicle information on the vehicle itself.

Figures 2, 3:
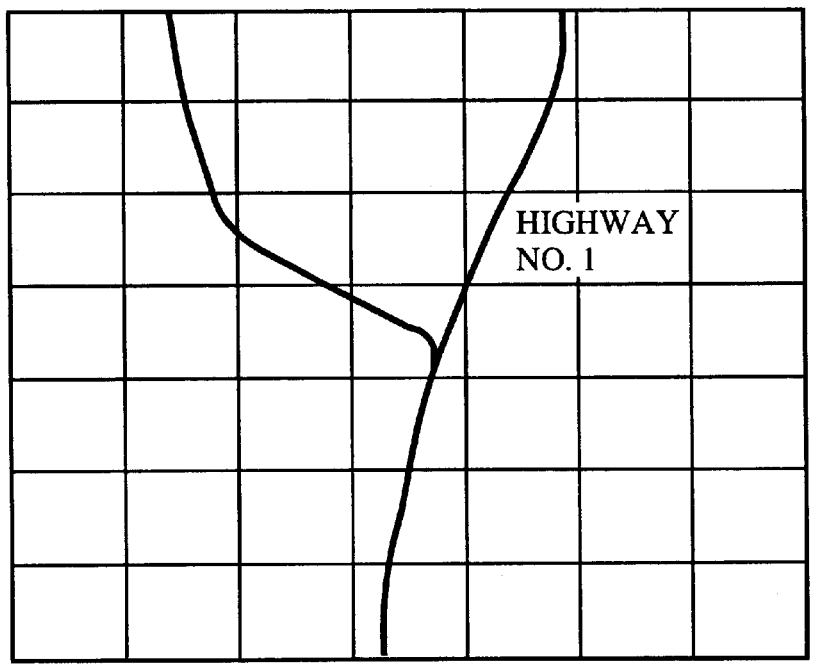
FIG. 2 is a screen diagram illustrating a screen on which a query is displayed.
FIG. 3 is a diagram illustrating a retrieval unit of weather information.

More specifically, when the driver or the like selects an initial setting mode for inputting the vehicle information, the display section 6 displays a query as illustrated in FIG. 2, to which a user is expected to reply with "Yes" or "No" to input the vehicle information. The vehicle information is stored in a memory in the data base 4 or in the route searching section 5.

The following queries are made, for example.

1. A query as to whether the vehicle is a 4WD (four-wheel drive) vehicle.
2. A query as to whether the vehicle is a convertible.
3. A query as to whether the vehicle is mounted with studless tires.
4. A query as to whether the vehicle is equipped with snow chains.
5. A query as to whether the vehicle carries snow chains.

Once the driver or the like inputs the vehicle information in this way, the route searching processing becomes possible. When the driver or the like inputs the destination by manipulating the operating section 3, the route searching processing is started.

More specifically, the information collecting section 2 collects, besides the position information received from the GPS by the receiving antenna 1 to indicate the current position of the vehicle, the weather information (including the weather at present, and weather forecast after a few minutes to a few hours), and regulation information (such as snow chain warning, speed limit and landslide warning).

Here, the weather information and regulation information can be obtained via FM multiplexed data broadcasting, VICS (Vehicle Information and Communication System; level 1 text information) or Internet. The weather information can be received on a mesh by mesh basis formed by dividing an area into squares of a few kilometer long as shown in FIG. 3. The regulation information can be received at every road link interval.

Once the information collecting section 2 collects the position information indicating the current position of the vehicle, the route searching section 5 starts searching for a route from the current position to the destination in accordance with the route search condition.

When the route search condition is to search for the shortest distance route from the present position to the destination (which is usually set by manipulating the operating section 3), the shortest distance route is searched for. On the other hand, when the route search condition is to search for the shortest time route, it is searched for (in which case, the search is carried out without taking account of the weather information or regulation information)

However, even when the route satisfying the search condition is found, if it is covered with snow on the way, the route will be impassable to the vehicle unless it is a 4 WD or equipped with snow chains.

Thus, considering the weather information and regulation information about the route, the route searching section 5 makes a decision on the practicability of the route, and if it is considered to be impassable, a new search for another route (detour) is carried out again.

More specifically, if the route searching section 5 finds that the retrieved route includes a section under regulation as a result of referring to the regulation information, it compares the regulation with its vehicle information, and makes a decision on the practicability. For example, when the snow chain warning is issued, and the vehicle is equipped or carrying the snow chains, it makes a decision that the route is passable. Even if the vehicle is not equipped with the snow chains, when it is a 4WD vehicle, the route searching section 5 also makes a decision that the route is passable.

Even if the snow chain warning is not issued, but if a decision is made from the weather information that there is or will be a snowfall, the route searching section 5 compares the snowfall with the vehicle information to make a decision on the practicability . In this case, even if the vehicle is not a 4WD vehicle or equipped with the snow chains, the route searching section 5 can decide that the route is passable if the snowfall is light. In contrast, even if the snowfall is light, it makes a decision that the route is impassable when the road is expected to be icy because of cold weather, or slippery because of the large inclination of the road (the inclination information is included in the road information from the database 4).

The route searching section 5 continues searching for the passable route until it is retrieved, displays the route on the display section 6, and completes the processing (the route can be informed by means of voice).

As described above, the present embodiment 1 is configured such that it searches for the route from the present position to the destination with taking account of the weather information and regulation information collected by the information collecting section 2 and the vehicle information collected by the operating section 3. This offers an advantage of being able to inform the driver of the route positively passable to the vehicle.

EMBODIMENT 2

Although the foregoing embodiment 1 considers the impassability because of the snowfall, the present invention is not limited to this. For example, when the vehicle is a convertible, and a decision is made from the weather information that there is or will be a rainfall, it can inform the driver of another detour. Alternatively, it can provide the driver or the like with a message to prompt him or her to place the top on the vehicle (the message can be provided by means of display or voice).

If the road information suggest a rainfall, and the road is expected to be muddy because it is unpaved, another detour may be exhibited.

EMBODIMENT 3

Although the foregoing embodiment 1 makes a decision, when the snow chain warning is issued, that the route is passable when the vehicle carries the snow chains, it can search for the route with taking account of a time period taken to mount the snow chains on tires when they are not yet mounted.

This will improve the accuracy of estimating the arrival time at the destination, offering an advantage of being able to improve the accuracy of the route search when the shortest time route is set as the search condition.

EMBODIMENT 4

Figure 4:
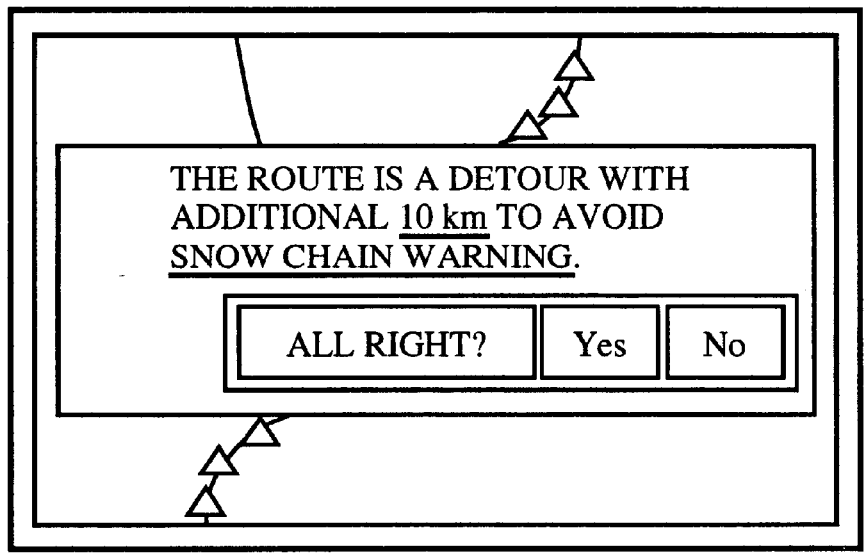
FIG. 4 is a screen diagram illustrating a screen on which a retrieved route is displayed as a roundabout route.

The foregoing embodiment 1 continues the route search until a passable route is found, and displays it on the display section 6 when it is retrieved. When the route retrieved by the route searching section 5 is a detour, the display section 6 may display it with a message indicating that the route is a roundabout route as shown in FIG. 4 (voice can be used instead of the display).

Figure 5:
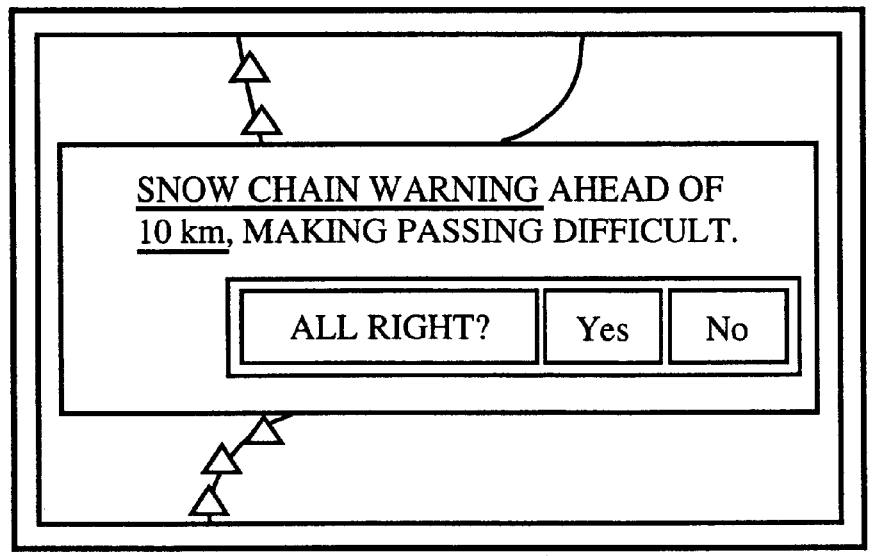

In this case, the route searching section 5, which constitutes a route description means, operates to display the roundabout route when the driver or the like selects "Yes" on the operating section 3. In contrast, when he or she selects "No", the route searching section 5 operates to display the route retrieved before the roundabout route (the route considered to be impassable, for example) as shown in FIG. 5 (with a message indicating that the route is probably impassable, and when "Yes" is selected on the screen as shown in FIG. 5, the route is displayed).

The present embodiment 4 offers an advantage of being able to make the driver or the like recognize that the retrieved route is the roundabout route.

EMBODIMENT 5

Figure 6:
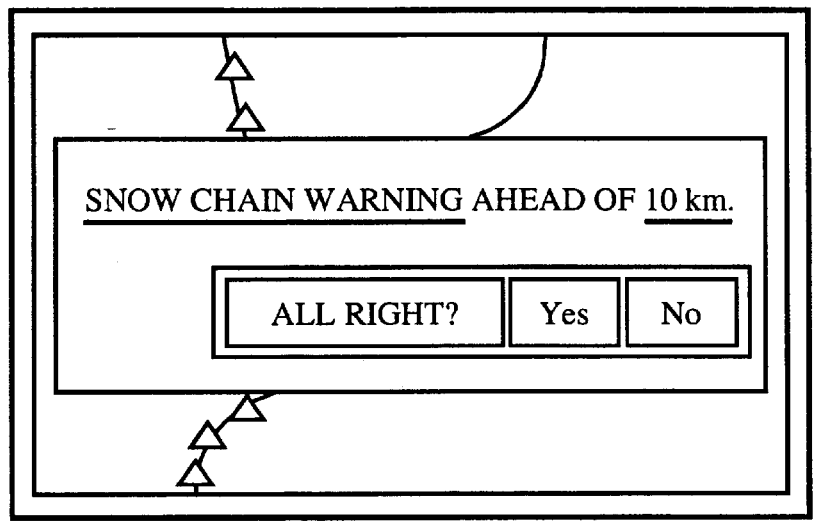
FIG. 6 is a screen diagram illustrating a screen exhibiting that the retrieved route includes a road under regulation.

Although the foregoing embodiment 1 continues the route search until a passable route is found, and displays it on the display section 6 when it is retrieved, if the route searched by the route searching section 5 includes a road under regulation, the display section 6 can display the regulation information about the road as shown in FIG. 6 (regulation information may be output in voice).

In this case, the route searching section 5, which constitutes a route description means, operates to display the route including the road under regulation when the driver or the like selects "Yes" on the operating section 3. In contrast, when he or she selects "No", it searches for another route.

This offers an advantage of being able to make the driver or the like recognize that he or she will meet the snow chain warning when taking the retrieved route.

EMBODIMENT 6

Figure 7:
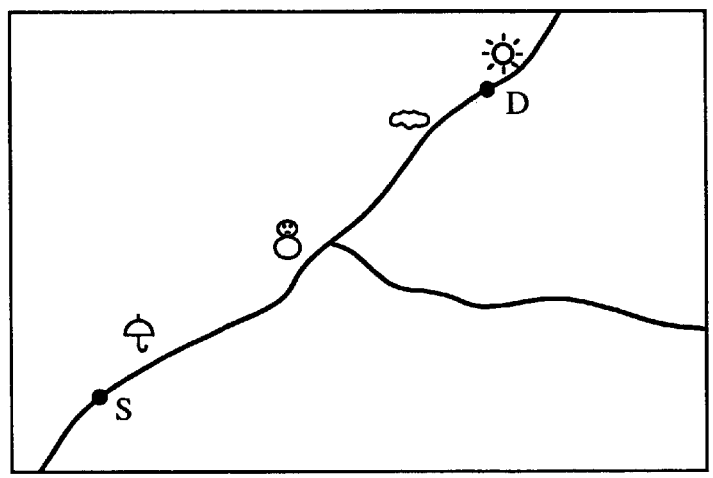

Although the foregoing embodiment 1 continues the route search until a passable route is found, and displays it on the display section 6 when it is retrieved, the route searching section 5 may constitute a marking means for putting weather marks to pass points on the route (see, FIG. 7). The weather of the pass points can be informed by means of voice.

This offers an advantage of being able to inform the driver or the like of the weather condition of the retrieved route.

The current weather marks can be replaced by expected weather marks obtained by estimating the time of passing the points and by referring to the weather forecast at the time.

This offers an advantage of being able to inform the driver or the like of the weather condition at the passing.

EMBODIMENT 7

Although the equipping condition of the snow chains or the like is input as the vehicle information in the foregoing embodiment 1, the vehicle information about the maintenance condition of the vehicle (such as the air pressure of tires, wear in the tires) may be input in order to make a decision as to whether the maintenance of the vehicle is required or not from the vehicle information or from the information of a sensor mounted on the vehicle (such as the remaining quantity of the oil or washer liquid, information indicating contamination of the oil). If a decision is made that the maintenance of the vehicle is necessary, the decision result can be displayed on the display section 6 (the information can be provided in voice). In this case, the route searching section 5 constitute a maintenance information means.

The maintenance of the vehicle is required when the air pressure of the tires is low, or the remaining quantity of the oil is small.

In connection with the information on the display section 6, a message can also be displayed for prompting the driver or the like to search for the route to a gas station or tire shop, or the search for this route can be carried out automatically.

The present embodiment 7 offers an advantage of being able to make the driver or the like recognize the need for maintenance.

EMBODIMENT 8

Although the foregoing embodiment 1 exhibits the retrieved route, when the retrieved route includes a toll road, it is possible for the display section 6 to display the toll on the vehicle by referring to the vehicle information input via the operating section 3 (the toll can be informed by means of voice). Although the toll is stored in the database 4, since the toll system differs depending on the type of the vehicle such as an ordinary car or light car, the toll is exhibited for the vehicle.

In this case, the route searching section 5 constitutes a toll information means.

This offers an advantage of being able to inform the driver or the like of the toll.

EMBODIMENT 9

In the foregoing embodiment 1, the route is exhibited from the present position to the destination, and when there is a parking lot in the destination, it is usually marked on the map.

However, there are cases where the parking lot is unavailable for the vehicle because of its height. If the parking lot is marked on the map in such a case, a problem arises that the vehicle goes to the parking lot although it cannot use it.

In view of this, the present embodiment 9 refers to the vehicle information when exhibiting the route retrieved by the route searching section 5, makes a decision as to whether the parking lot at the destination is available for the vehicle or not (the information on the parking lot is stored in the database 4), and prevents the parking lot from being marked on the map if it is unavailable.

This offers-an advantage of being able to prevent the vehicle from going to the unavailable parking lot.

INDUSTRIAL APPLICABILITY

As described above, the navigation system in accordance with the present invention is suitable not only for retrieving the route with the shortest distance or the like in exhibiting the optimum route, but also for retrieving the route positively passable to the vehicle.

What is claimed is:

1. A navigation system comprising:
   information collecting means for collecting weather information;
   information input means for inputting vehicle information on the vehicle itself;
   route searching means for searching for a route from a present position to a destination with taking account of the weather information collected by said information collecting means and the vehicle information input by said information input means; and
   presentation means for providing the route retrieved by said route searching means.

2. The navigation system according to claim 1, wherein said information collecting means collects regulation information on a road besides the weather information, and said route searching means searches for the route with considering the regulation information.

3. The navigation system according to claim 2, wherein said route searching means searches for another route if the retrieved route is probably impassable to the vehicle even though the route satisfies a search condition.

4. The navigation system according to claim 3, further comprising route description means for indicating, when said route searching means retrieves another route, that the another 5 route is a roundabout route.

5. The navigation system according to claim 3, further comprising route description means for exhibiting, when the route retrieved by said route searching means includes a road under regulation, regulation information about the road.

6. The navigation system according to claim 3, further comprising marking means for putting weather marks on pass points on the route retrieved by said route searching means by referring to weather information collected by said information collecting means.

7. The navigation system according to claim 6, wherein said marking means estimates passing time at the pass points, and puts the weather marks at the passing time.

8. The navigation system according to claim 3, further comprising maintenance information means for making a decision as to whether maintenance of the vehicle is necessary or not from the vehicle information input by said information input means, or from information collected by a sensor mounted on the vehicle, and exhibits information indicating need of the maintenance when it is necessary.

9. The navigation system according to claim 3, further comprising toll information means for exhibiting, when the route retrieved by said route searching means includes a toll road, a toll on the vehicle by referring to the vehicle information input by said information input means.

10. The navigation system according to claim 3, wherein said presentation means refers to the vehicle information input by said information input means when exhibiting the route retrieved by said route searching means, makes a decision as to whether a parking lot at the destination is available for the vehicle, and halts informing the parking lot when the parking lot is unavailable for the vehicle.

11. The navigation system according to claim 2, wherein said route searching means searches for the route with considering a time period taken to mount snow chains on tires if the vehicle carries the snow chains, but is not yet equipped with the snow chains, when the route includes a road under snow chain warning.

12. A vehicle navigation system comprising:
    information collecting element collecting weather information;
    an input receiving vehicle information;
    a processor operatively connected to said information collecting element and to said input, said processor searching for a route from a present position to a destination based on weather information collected by said information collecting element and based on vehicle information received by said input; and
    an output operatively connected to said processor and providing the result of the search by said processor.

13. The navigation system according to claim 12, wherein said information collecting element also collects regulation information on a road, and wherein said processor searches for a route based further on regulation information collected by said collecting element.

14. The navigation system according to claim 13, wherein said processor searches for a route based further on information on whether a route is passable.

15. The navigation system according to claim 14, wherein said processor characterizes a route as a roundabout.

16. The navigation system according to claim 14, wherein said processor provides regulation information about a road forming part of a route resulting from the search by said processor.

17. The navigation system according to claim 14, wherein said processor associates weather marks on pass points on a route resulting from the search by said processor, said marks referring to weather information collected by said information collecting element.

18. The navigation system according to claim 17, wherein said processor estimates passing time at the pass points, and puts the weather marks at the passing time.

19. The navigation system according to claim 14, wherein said processor determines whether maintenance of the vehicle is necessary based on vehicle information received by said input, or obtained by a sensor mounted on the vehicle.

20. The navigation system according to claim 14, wherein said processor determines whether a route that is the result of the search includes a toll road.

21. The navigation system according to claim 14, wherein said output provides the vehicle information received by said input, said processor determining whether a parking lot at the destination is available for the vehicle, and said processor halts informing the parking lot when the parking lot is unavailable for the vehicle.

22. The navigation system according to claim 13, wherein said processor determines whether a road is under snow chain warning, said processor searching for a route based further on a time period to mount snow chains on tires if the vehicle is not yet equipped with snow chains but carries the snow chains.

23. A method for navigating a vehicle, said method comprising:

collecting weather information;

determining vehicle information;

searching, by a processor in the vehicle, for a route from a present position to a destination based on said collected weather information and based on said determined vehicle information; and outputting the result of the search by the processor.

24. The method according to claim 23, further comprising collecting regulation information on a road, and searching for a route based further on said collected regulation information.

25. The method according to claim 24, further comprising searching for a route based further on information on whether a route is passable.

26. The method according to claim 25, further comprising characterizing a route as a roundabout.

27. The method according to claim 25, further comprising providing regulation information about a road forming part of a route resulting from said searching by the processor.

28. The method according to claim 25, further comprising associating weather marks on pass points on a route resulting from said search by the processor, said marks referring to said collected weather information.

29. The method according to claim 28, further comprising estimating passing time at the pass points, and putting the weather marks at the estimated passing time.

30. The method according to claim 25, further comprising determining whether maintenance of the vehicle is necessary based on said determined vehicle information.

31. The method according to claim 25, further comprising determining whether a route that is the result of said search by the processor includes a toll road.

32. The method according to claim 25, further comprising providing said determined vehicle information to an output, determining whether a parking lot at the destination is available for the vehicle, and halting informing the parking lot when the parking lot is unavailable for the vehicle.

33. The method according to claim 24, further comprising determining whether a road is under snow chain warning, and searching for a route based further on a time period to mount snow chains on tires if the vehicle is not yet equipped with snow chains but carries the snow chains.

\* \* \* \* \*